(12) United States Patent
Brockmeier et al.

(10) Patent No.: US 12,534,360 B2
(45) Date of Patent: Jan. 27, 2026

(54) GENERATING A MEMS DEVICE WITH GLASS COVER AND MEMS DEVICE

(71) Applicant: Infineon Technologies AG, Neubiberg (DE)

(72) Inventors: Andre Brockmeier, Villach (AT); Rafael Janski, Villach (AT); Boris Kirillov, Judendorf-Straßenge (AT); Marten Oldsen, Anzing (DE); Clemens Roessler, Villach (AT); Francisco Javier Santos Rodriguez, Villach (AT); Sokratis Sgouridis, Annenheim (AT); Kurt Sorschag, Villach (AT)

(73) Assignee: Infineon Technologies AG, Neubiberg (DE)

( * ) Notice: Subject to any disclaimer, the term of this patent is extended or adjusted under 35 U.S.C. 154(b) by 997 days.

(21) Appl. No.: 16/890,534

(22) Filed: Jun. 2, 2020

(65) Prior Publication Data

US 2020/0385264 A1    Dec. 10, 2020

(30) Foreign Application Priority Data

Jun. 7, 2019    (DE) .......................... 102019208373.0

(51) Int. Cl.
  B81C 1/00    (2006.01)
  B81B 7/00    (2006.01)
  (Continued)

(52) U.S. Cl.
  CPC ........ B81C 1/00269 (2013.01); B81B 7/0067 (2013.01); G01S 7/4817 (2013.01);
  (Continued)

(58) Field of Classification Search
  CPC ............ B81C 1/00269; B81C 1/00317; B81C 2203/01–0118; B81C 1/00277;
  (Continued)

(56) References Cited

U.S. PATENT DOCUMENTS 7,045,868 B2    5/2006   Ding et al.
8,105,941 B2    1/2012   Huang
(Continued)

FOREIGN PATENT DOCUMENTS

CN    101167187 A    4/2008
CN    101412493 A    4/2009
(Continued)

OTHER PUBLICATIONS

Masaharu Takahashi et al.,Nanoimprint of Glass Materials with Glassy Carbon Molds Fabricated by Focused-Ion-Beam Etching, 2005, Jpn. J. Appl. Phys. 44 5600 (Year: 2005).*

*Primary Examiner* — Christine S. Kim
*Assistant Examiner* — Tyler J Wiegand
(74) *Attorney, Agent, or Firm* — Harrity & Harrity, LLP

(57) ABSTRACT

In a method of generating a microelectromechanical system, MEMS, device, a MEMS substrate including a movable element is provided. A glass cover member including a glass cover is formed by hot embossing. The glass cover member is bonded to the MEMS substrate so as to hermetically seal by the glass cover a cavity in which the movable element is arranged.

25 Claims, 11 Drawing Sheets

(51) Int. Cl.
*G01S 7/481* (2006.01)
*G02B 26/08* (2006.01)

(52) U.S. Cl.
CPC .... *G02B 26/0833* (2013.01); *B81B 2201/042* (2013.01); *B81B 2201/047* (2013.01); *B81C 2201/036* (2013.01); *B81C 2203/0118* (2013.01); *B81C 2203/037* (2013.01)

(58) Field of Classification Search
CPC ...... B81C 2203/0145; B81C 2203/054; B81C 2201/03; B81B 7/0067; B81B 2201/04–047; B81B 7/0032–0035
See application file for complete search history.

(56) References Cited

U.S. PATENT DOCUMENTS

| | | | |
|---|---|---|---|
| 8,517,545 | B2 | 8/2013 | Quenzer et al. |
| 9,348,134 | B2 | 5/2016 | Ichii |
| 10,586,745 | B2 | 3/2020 | Oka et al. |
| 10,607,904 | B2 | 3/2020 | Oka et al. |
| 10,752,500 | B2 | 8/2020 | Quenzer et al. |
| 2003/0170966 | A1 | 9/2003 | Lutz |
| 2004/0087043 | A1* | 5/2004 | Lee .......... H01L 23/04 257/E23.181 |
| 2005/0184304 | A1 | 8/2005 | Gupta et al. |
| 2006/0176539 | A1 | 8/2006 | Choi et al. |
| 2007/0024549 | A1 | 2/2007 | Choi et al. |
| 2007/0284681 | A1 | 12/2007 | Massieu et al. |
| 2008/0194053 | A1 | 8/2008 | Huang |
| 2009/0097087 | A1 | 4/2009 | Wolter et al. |
| 2010/0014147 | A1 | 1/2010 | Pinter et al. |
| 2010/0061073 | A1* | 3/2010 | Oldsen .......... G02B 26/0833 361/807 |
| 2010/0330332 | A1* | 12/2010 | Quenzer .......... B81B 7/0067 65/106 |
| 2013/0105921 | A1* | 5/2013 | Najafi .......... G01C 19/574 257/E29.324 |
| 2017/0297898 | A1 | 10/2017 | Torkkeli et al. |
| 2017/0327419 | A1* | 11/2017 | Boek .......... C01G 19/02 |
| 2018/0022601 | A1* | 1/2018 | Waechter .......... B81B 7/0077 257/414 |
| 2018/0068975 | A1* | 3/2018 | Rupp .......... H01L 21/4803 |

FOREIGN PATENT DOCUMENTS

| | | |
|---|---|---|
| CN | 101578686 A | 11/2009 |
| CN | 103616123 A | 3/2014 |
| CN | 104003348 A | 8/2014 |
| CN | 104423036 A | 3/2015 |
| CN | 107305288 A | 10/2017 |
| CN | 109153562 A | 1/2019 |
| CN | 109155289 A | 1/2019 |
| CN | 109417053 A | 3/2019 |
| DE | 102008012384 A1 | 9/2009 |

* cited by examiner

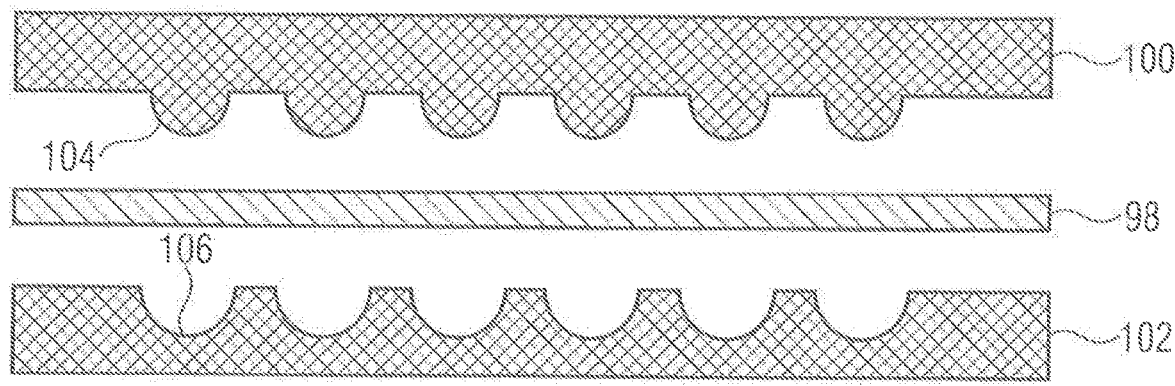
Fig. 6A
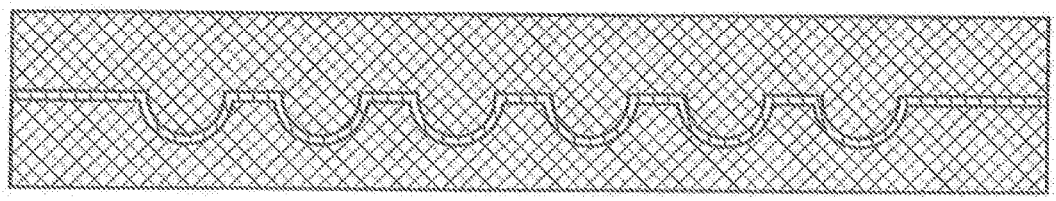
Fig. 6B
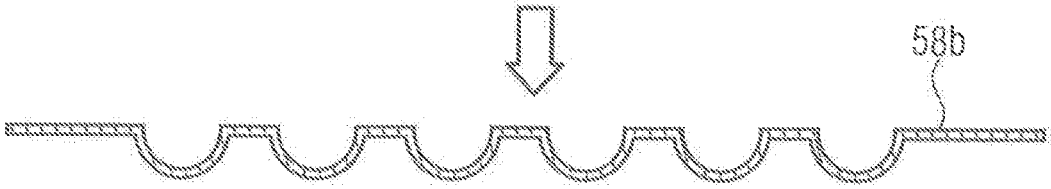
Fig. 6C

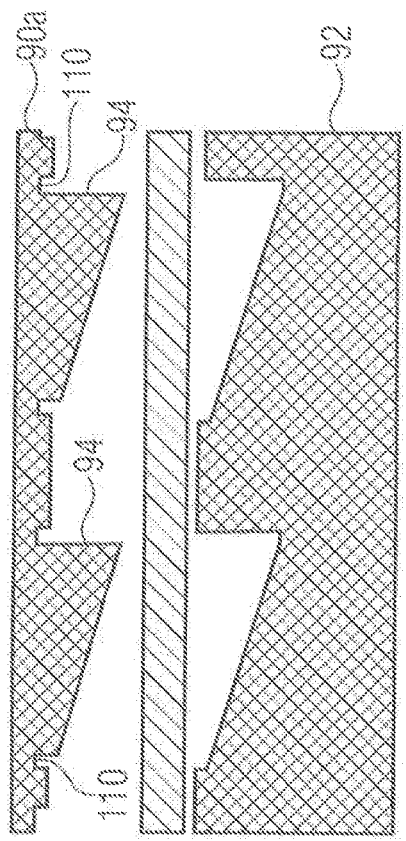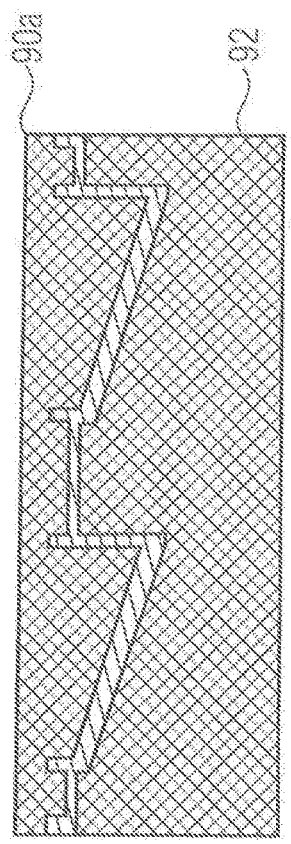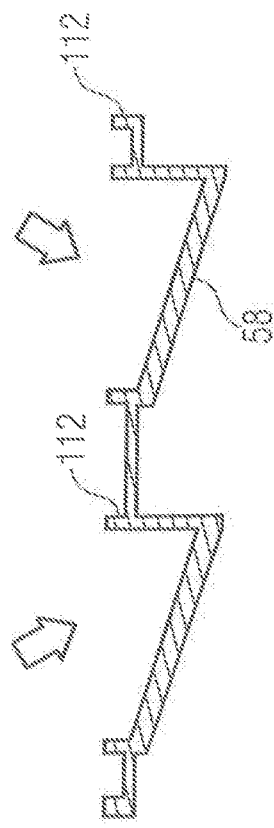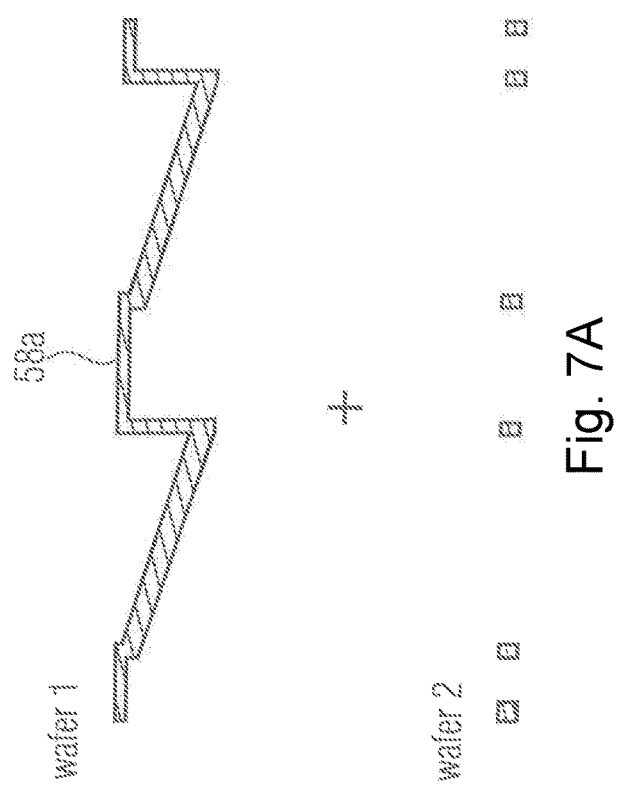

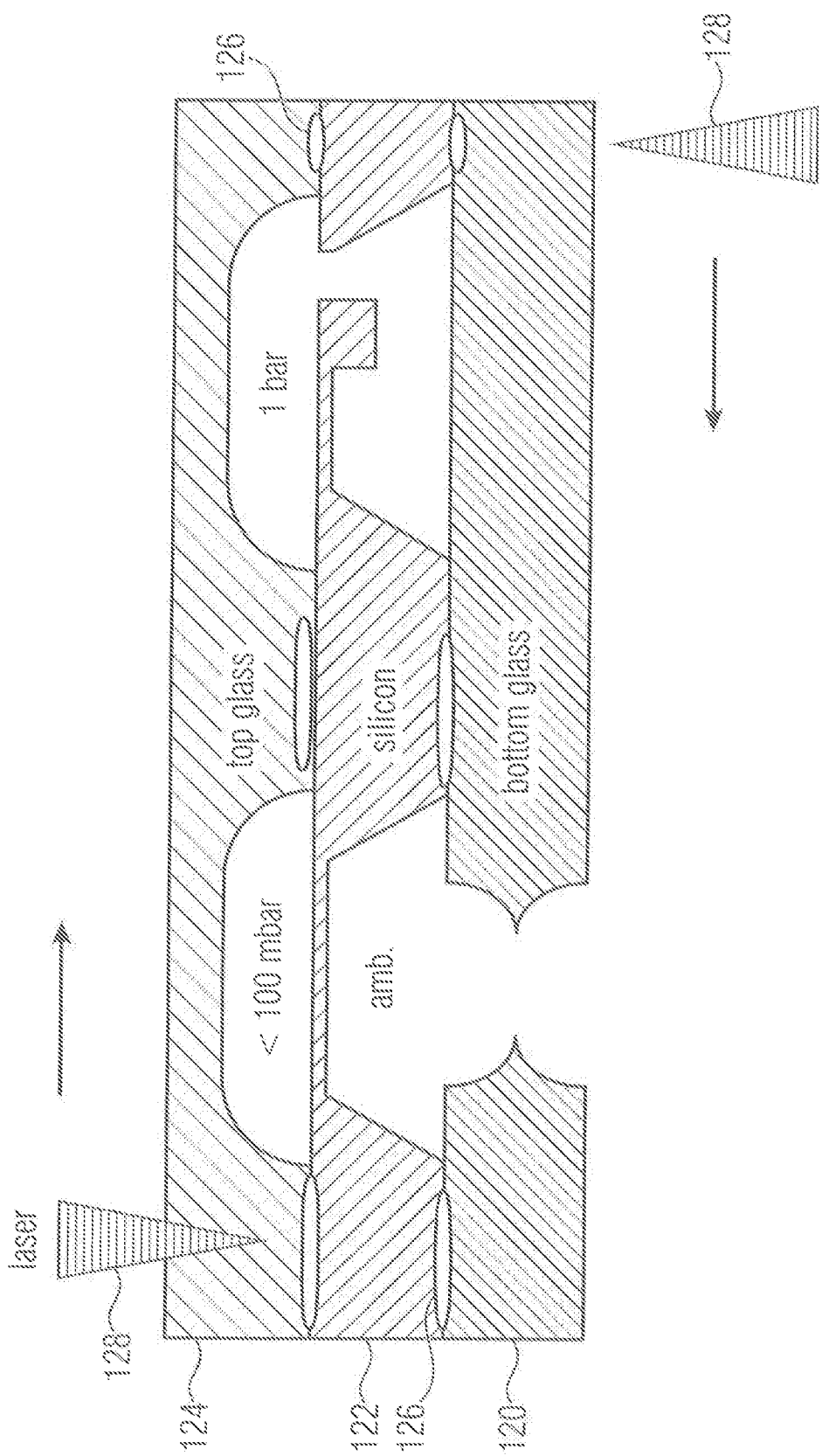

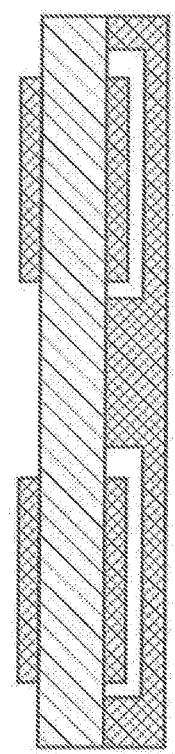
Fig. 11A
Fig. 11B
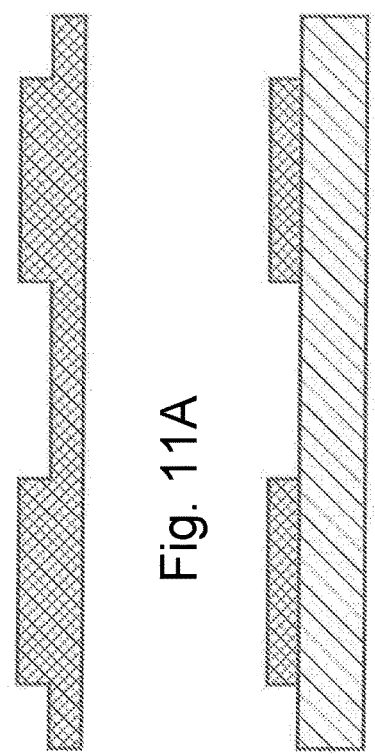
Fig. 11C
Fig. 11D
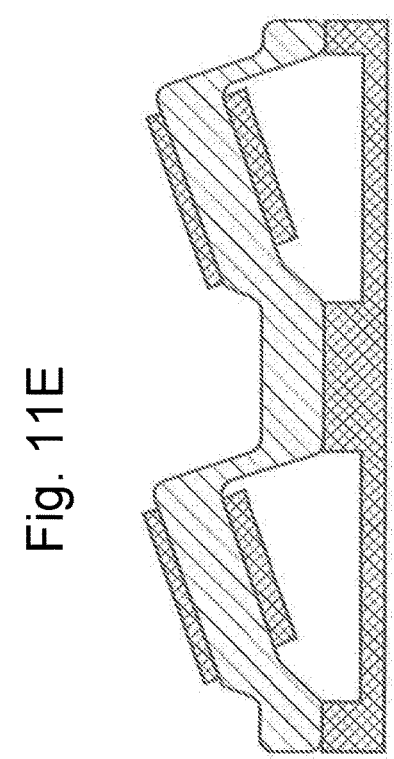
Fig. 11E
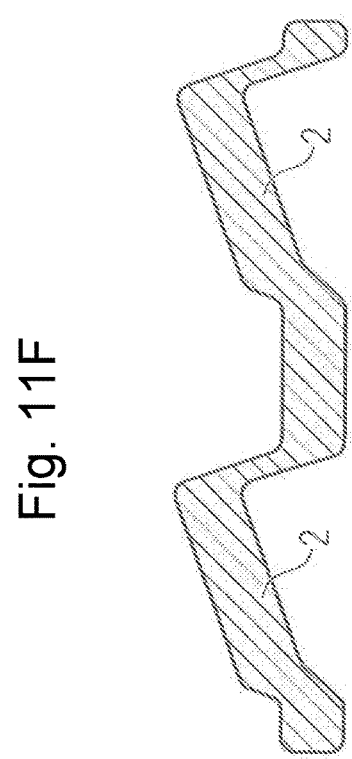
Fig. 11F
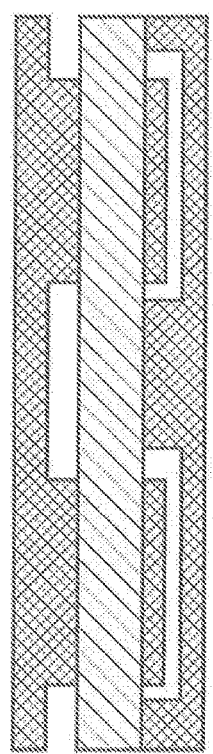
Fig. 11G

GENERATING A MEMS DEVICE WITH GLASS COVER AND MEMS DEVICE

FIELD

The present disclosure relates to a method of generating a microelectromechanical, MEMS, device and a corresponding MEMS device, and, in particular, a packaged MEMS device comprising a glass cover.

BACKGROUND

A microelectromechanical system, MEMS, is a system comprising electrical and mechanical components having dimensions in the micrometer range and below. Generally, a MEMS may be formed in a MEMS substrate. The MEMS substrate may include several layers formed of different materials, such as semiconductor layers, dielectric layers and conductive layers. Typical semiconductor layers may be formed of silicon, typically dielectric layers may be formed of oxide and typical conductive layers may be formed of metal or highly doped silicon. The MEMS may include a movable element, such a mirror, which is supported by the MEMS substrate in a movable manner, such as a rocking manner.

Sometimes, the movable element of a MEMS is to be housed in a hermetically sealed manner so as to protect the movable element from external impacts. Different packages may be used for this purpose. Recent MEMS technologies represent new demands for the package of MEMS devices. Particularly for micro-opto-electro-mechanical systems, MOEMS, i.e., optical applications, such as micro mirror or optical gas sensors, an optical entrance for light measuring signals to the respective MEMS device is required. Such an optical entrance may be via a transparent substrate (e.g. glass). Since parameters as transmission and reflection are significant parameters for the quality of the package, package geometries may be generated in a three-dimensional manner.

In hybrid packages, a package cover formed of sidewalls of a first material and a planar glass member attached to the sidewalls may be bonded to a MEMS substrate. The first material may be ceramic or metal. Generally, the planar glass member should be arranged with an acute angle with respect to the substrate plane of the MEMS substrate in order to minimize possible losses, reflection interferences, and signal noise in a projected image area. Manufacturing of hybrid packages is difficult and expensive. Moreover, it is difficult to achieve hermetic sealing and good reproducibility with hybrid packages. In addition, maneuvering and assembly of hybrid package structures is difficult. To form the package, the MEMS substrate may be placed within a package housing and the glass plate may be adhered to the package housing. During the whole assembly, there is a risk of contamination of the MEMS, such as by particles, so that the functionality of the MEMS may be affected.

In other approaches, the package is generated along with the MEMS structure on wafer level. In other words, a cover member may be formed integrally with the MEMS structures on wafer level or may be attached to the MEMS wafer on wafer level. For example, glass covers for MEMS structures may be generated using a so-called reflow method. The reflow method uses the fact that glass at its softening point behaves as an ideal Newtonian liquid. The glass flow velocity may be influenced locally by artificially generated non-centered silicon islands resulting in a tilting of the glass. FIGS. 11A to 11G show a possible process flow to generate a glass cover using a reflow process. FIG. 11A shows a first support layer. FIG. 11B shows a glass layer having silicon islands formed on a first surface thereof. As shown in FIG. 11C, a second support layer is attached to the first surface of the glass layer such that the silicon islands are arranged within recesses of the second support layer. As shown in FIG. 11D, the first support layer is attached to the second surface of the glass layer. Parts of the first support layer are removed so that silicon islands are formed on the second surface of the glass layer and face the silicon islands formed on the first surface of the glass layer, FIG. 11E. Thereupon, the glass layer is heated to its softening point so that a reflow and a reformation of the glass layer takes place. The resulting structure is shown in FIG. 11F. Then, the silicon islands and the second support layer are removed and the 3D glass cover shown in FIG. 11G is achieved. This process may take place on wafer level and FIG. 11G shows two glass covers comprising respective planar portions 2. Upon attaching the respective glass cover to a MEMS wafer, the glass covers may be separated from each other.

The process to generate glass covers using such a reflow process is complex as it involves at least three to six photolithographic steps, a glass substrate and four further substrates, such as silicon substrates. Moreover, numerous and expensive process steps are involved, such as plasma etching and grind and bond processes. Three of the involved substrates are used as sacrificial wafers. Reproducibility of the angle of the glass cover generated by the reflow process may not be achieved. Variation of the angle should be within a range of ±1° over the whole diameter of the substrate, i.e. wafer, dependent on the specific application. This results in even higher demands with respect to alignment precision of the individual structure giving elements and reduces the degrees of freedom in processing.

Accordingly, there is still room for improvements in generating MEMS devices and, in particular, in providing package covers for MEMS devices.

SUMMARY

Examples of the present disclosure provide a method of generating a microelectromechanical system, MEMS, device, the method including: providing a MEMS substrate including a movable element; forming a glass cover member including a glass cover by hot embossing; and bonding the glass cover member to the MEMS substrate so as to hermetically seal by the glass cover a cavity in which the movable element is arranged.

Examples of the present disclosure provide a microelectromechanical system, MEMS, device including: a MEMS substrate including a movable element; and a hot embossed glass cover, wherein the hot embossed glass cover is bonded to the MEMS substrate so that a cavity in which the movable element is arranged is hermetically sealed.

In examples of the present disclosure, a glass cover of a packaged MEMS device is generated by hot embossing. In hot embossing, heated glass is pressed between two pressing tools or molds so that, after pressing and cooling down, the glass has a desired shape. Examples permit providing the glass cover for a packaged MEMS device with reduced effort, increased reproducibility and improved optical properties. In examples, the MEMS is a micro-opto-electro-mechanical system and the glass cover is to pass light from the outside to the movable element packaged using the glass cover.

BRIEF DESCRIPTION OF THE DRAWINGS

Examples of the disclosure will be described using the accompanying drawings, in which:

FIGS. 6A to 6C show schematic cross-sectional views of an example of hot embossing glass covers having a dome shaped structure;

FIGS. 7A to 7D show schematic views of an example of hot embossing glass covers including spacers;

FIG. 8 shows a schematic cross-sectional view showing bonding locations;

FIGS. 11A to 11G show schematic cross-sectional views of a reflow process.

DETAILED DESCRIPTION

In the following, examples of the present disclosure will be described in detail using the accompanying drawings. It is to be pointed out that the same elements or elements that have the same functionality are provided with the same or similar reference numbers, and that a repeated description of elements provided with the same or similar reference numbers is typically omitted. Hence, descriptions provided for elements having the same or similar reference numbers are mutually exchangeable. In the following description, a plurality of details is set forth to provide a more thorough explanation of examples of the disclosure. However, it will be apparent to one skilled it the art that other examples may be practiced without these specific details. In other instances, well-known structures and devices are shown in block diagram form rather than in detail in order to avoid obscuring examples described herein. In addition, features of the different examples described herein may be combined with each other, unless specifically noted otherwise. It is to be noted that the drawings are not necessarily drawn to scale, unless explicitly stated. It is to be noted that elements useful for understanding the disclosure are described.

Examples of the present disclosure relate to the generation or fabrication of a 3D package suitable for optical MEMS applications. Examples use pressing of glass softened to its softening point, which may be referred to as hot embossing. Hot embossing may be used on wafer level to generate a glass cover member which may be bonded to a MEMS wafer using any suitable bonding process. Examples of the present disclosure permit the effort and the costs for generating the package to be reduced substantially when compared to a hybrid generation of a cover. In addition, examples may provide additional degrees of freedom in processing and an improved reproducibility. Examples permit the MEMS structure to be encapsulated in the frontend so that further particle contamination may be avoided, such as during tests, during pre-assembly and/or during printed circuit board assembly. Examples permit further steps in the preassembly, such as singularizing the wafer into separate devices, to be conducted using well established methods, such as mechanical sawing.

Figure 1:
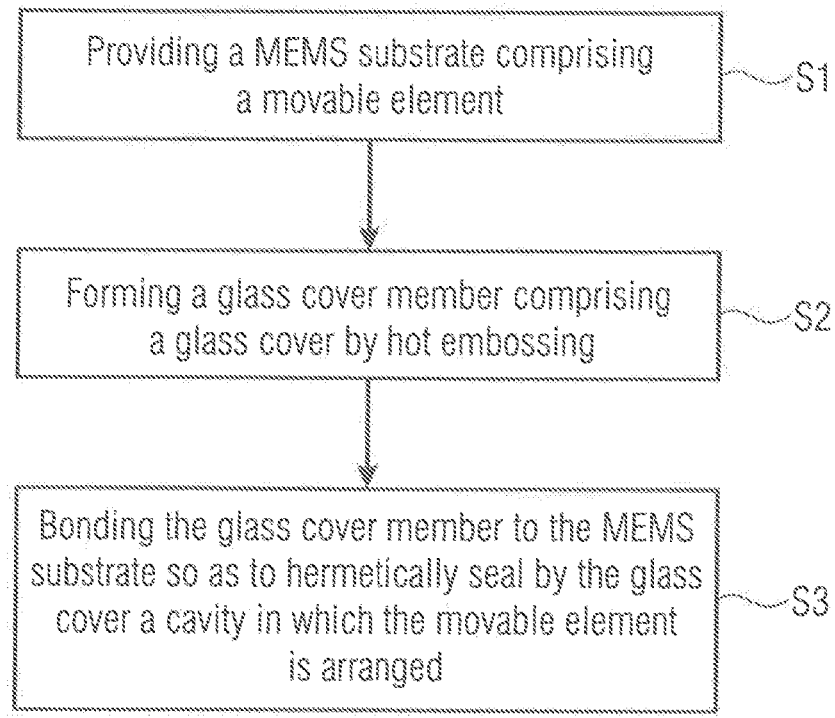
FIG. 1 shows a flow diagram of an example of a method of generating a MEMS device according to the present disclosure.

FIG. 1 shows an example of a method of generating a MEMS device, wherein a MEMS substrate comprising a movable element is provided at S1. A glass cover member comprising a glass cover is formed by hot embossing at S2. At S3, the glass cover member is bonded to the MEMS substrate so as to hermetically seal under a defined inner pressure by the glass cover a cavity in which the movable element is arranged.

Since the glass cover member is formed by hot embossing, the glass cover may be implemented with desired dimensions and with a desired surface quality which are difficult to be implemented using typical mechanical or wet chemical methods. Moreover, examples permit the generation of glass covers with flank or sidewall angles in a range of 90°, which are difficult to be produced with common approaches or which may be produced by common processes with high effort only. Such effects may be achieved using the method of hot embossing the glass.

Figure 2:
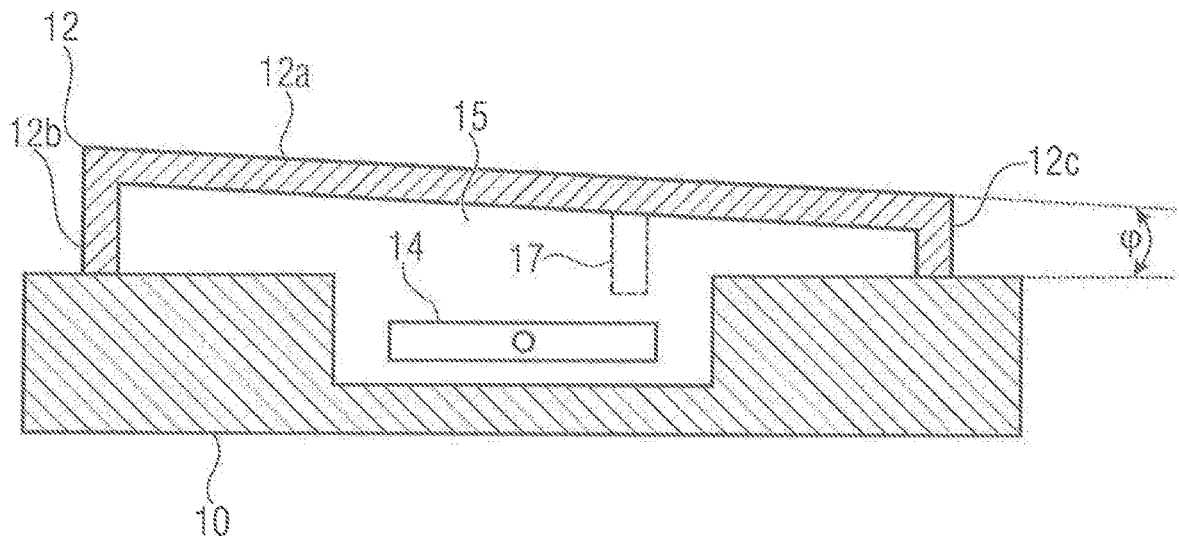
FIG. 2 shows a schematic cross-sectional view of an example of a MEMS device according to the present disclosure.

FIG. 2 shows a schematic cross-sectional view of an example of a MEMS device according to the present disclosure. The MEMS device comprises a MEMS substrate 10 and a glass cover 12. The MEMS substrate 10 comprises a movable element 14. The movable element 14 may be any movable element conceivable, such as a deflectable mirror, a deflectable membrane of a sensor, a cantilever beam, or a movable element of a mechanical switch. In examples, the MEMS device is an optical MEMS device, wherein the glass cover 12 is transmissive for light of at least a specific wavelength so that incident light may pass the glass cover and reach the movable element. In examples, the movable element is to reflect the light back through the glass cover 12 to an external receiver. At the same time, parasitic reflections out of the optical pathway may take place. In examples, the movable element 14 may be part of an optical gas sensor. The glass cover 12 is formed by hot embossing and is bonded to the MEMS substrate 10 so that a cavity 15 in which the movable element 14 is arranged is hermetically sealed.

In examples, a first glass cover member is bonded to a first side of the MEMS substrate and a second glass cover member to a second side of the MEMS substrate opposite the first side thereof. Thus, in examples, a movable member of a MEMS device may be sealed from two opposite sides of the MEMS substrate. In examples, the second glass cover member may also be hot embossed. In other examples, another cover member may be attached to the second side of the MEMS substrate, such as a cover member of a different material formed by a different process. In other examples, the MEMS substrate may be closed on the second side and an additional cover member is not attached to the second side.

In examples, the glass cover member is generated on wafer level. Thus, a plurality of glass covers for MEMS devices may be formed in a parallelized manner. The glass cover member may be attached to a MEMS wafer so that movable elements associated with different MEMS devices of the MEMS wafer are hermetically sealed in different cavities. The MEMS devices may then be individualized from the wafer so that separate MEMS devices are generated.

In examples, providing the MEMS substrate comprises providing a MEMS wafer comprising a plurality of movable elements, wherein the glass cover member comprises a plurality of glass covers and wherein the glass cover member is bonded to the MEMS substrate so as to hermetically seal by each glass cover one of a plurality of cavities, wherein one of the plurality of movable elements is arranged in each of the cavities.

In examples, providing the MEMS substrate comprises providing a MEMS wafer comprising a plurality of movable elements, wherein a first glass cover member comprises a plurality of first glass covers, wherein a second glass cover member comprises a plurality of second glass covers, wherein the glass cover members are bonded to the MEMS substrate so as to hermetically seal by respective first and second glass covers one of a plurality of cavities, wherein one of the plurality of movable elements is arranged in each of the cavities.

In examples, the method further comprises singularizing the MEMS wafer and the glass cover member or glass cover members bonded thereto into a plurality of MEMS devices, wherein the cavities remain hermetically sealed.

Thus, examples of the present disclosure permit sealing the cavity or cavities including the movable element or elements at the wafer level so that contamination of the movable elements can be avoided. In examples, the glass cover member or glass cover members are bonded to the MEMS substrate at the presence of an inert process gas to further reduce the risk of contamination.

In examples, any suitable method for bonding the glass cover member or glass cover members to the MEMS substrate may be used. In examples, bonding the or each glass cover member to the MEMS substrate comprises using a local melting method (e.g. laser microwelding method).

In examples, the glass cover or the glass covers may comprise side walls extending in an angle of between 80° and 90° relative to a plane of the MEMS substrate. Reference is made to sidewalls 12b and 12c shown in FIG. 2, for example. The sidewalls completely surround cavity 15 at the sides thereof. Sidewalls extending in such a direction may be difficult to produce with other methods that permit implementing glass cover members on wafer level, such as reflow processes. First ends of the sidewalls are bonded to the MEMS substrate. Second ends of the sidewalls may be connected to a planar or dome shaped portion of the glass cover.

In examples, the glass cover or the glass covers may comprise a planar portion 12a connecting ends of the side walls 12b, 12c, which face away from the MEMS substrate 10, the planar portion 12a being inclined relative to a plane of the MEMS substrate 10. An angle of inclination φ is indicated in FIG. 2. In examples, the angle φ may be in a range of 5° to 20°. In examples, the thickness of the sidewalls 12b, 12c is within a range of the thickness of the planar portion 12a±25%, typically within a range of the thickness of the planar portion±10%. In other words, the thickness of the sidewalls 12b, 12c may be identical to the thickness of the top cover member connected to the sidewalls with a tolerance range of ±25% or ±10%. Sidewalls having a thickness in the range of the thickness of the planar portion may be difficult to produce with other methods that permit implementing glass cover members on wafer level, such as reflow processes.

In examples, forming the glass cover member comprises forming a mechanical stop member protruding from the glass cover inward and representing a mechanical stop for a movement of the movable element upon bonding the glass cover member to the MEMS substrate. An example of a stop member 17 is schematically shown in FIG. 2. The stop member may be arranged to limit the moving range of the movable element 14. In the example shown, stop member 17 may be arranged to stop movement of the part of element 14 facing the stop member in an upward direction. Integrating such a stop member into a cover member may be difficult to produce with other methods that permit implementing glass cover members on wafer level, such as reflow processes.

In examples, the glass cover comprises sharp edges between different portions thereof and does not comprise rounded transitions between portions thereof. Such sharp edges may not be produced with other that permit implementing glass cover members on wafer level, such as reflow processes. Reference is made to FIG. 11, for example, clearly showing rounded edges of the glass cover member. Accordingly, a glass cover not having such rounded edges but having sharp edges may clearly distinguish a glass cover formed by hot embossing from a glass cover formed by a reflow process.

In examples, all structures of the glass cover member attached to one side of the MEMS substrate are formed using the hot embossing technique in a single piece. In examples, a perforated spacer layer may be provided between the glass cover member and the MEMS substrate prior to bonding the glass cover member to the MEMS substrate. The perforated spacer layer may also be formed as a hot embossed glass layer. In other examples, spacer structures are hot embossed together with the glass cover member in a single piece. In other examples, the perforated spacer layer may be formed using wet chemical methods.

In examples, depending on the application, the glass cover may have a different shape. In examples, the cover may include a dome shaped portion rather than a planar portion. Substantially every conceivable shape may be implemented using the hot embossing technology so that examples of the present disclosure are suitable for a large number of possible applications.

In examples, the movable element is a movable mirror for light detection and ranging, LIDAR, applications. In examples, the movable element is a movable part of an optical gas sensor, of an optical pressure sensor or of an optical acceleration sensor.

The hot embossing technology permits surfaces of the glass cover member to be manufactured with a low surface roughness of less than 4 nm. Thus, a high optical quality with respect to transmittance may be achieved, wherein reflection and refraction of light at the glass cover may be prevented or minimized.

In examples, the present the disclosure provides the generation of a 3D package for MEMS applications, such as optical MEMS applications, using the method of hot embossing of glass. In examples, this takes place on wafer level. The 3D package structures generated on wafer level are then bonded to a system wafer, i.e., a MEMS wafer, in an irreversible manner.

Figure 3A:
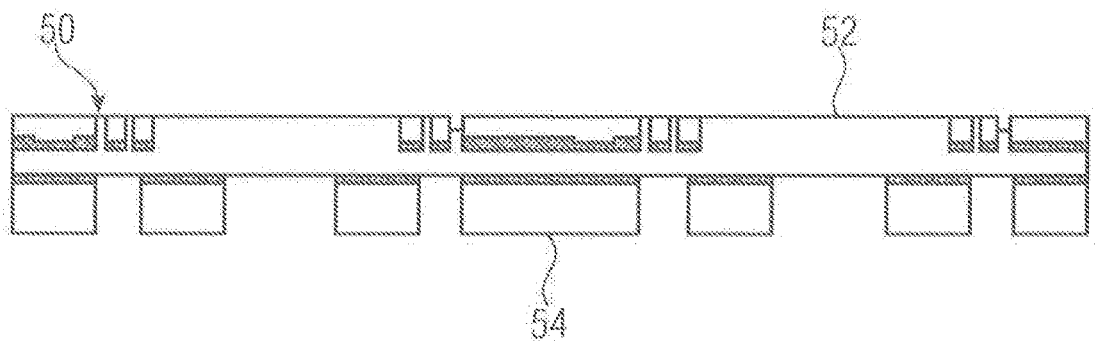
FIGS. 3A to 3F show schematic cross-sectional views helpful in explaining an example of a method of generating a MEMS device according to the present disclosure.
Figure 3B:
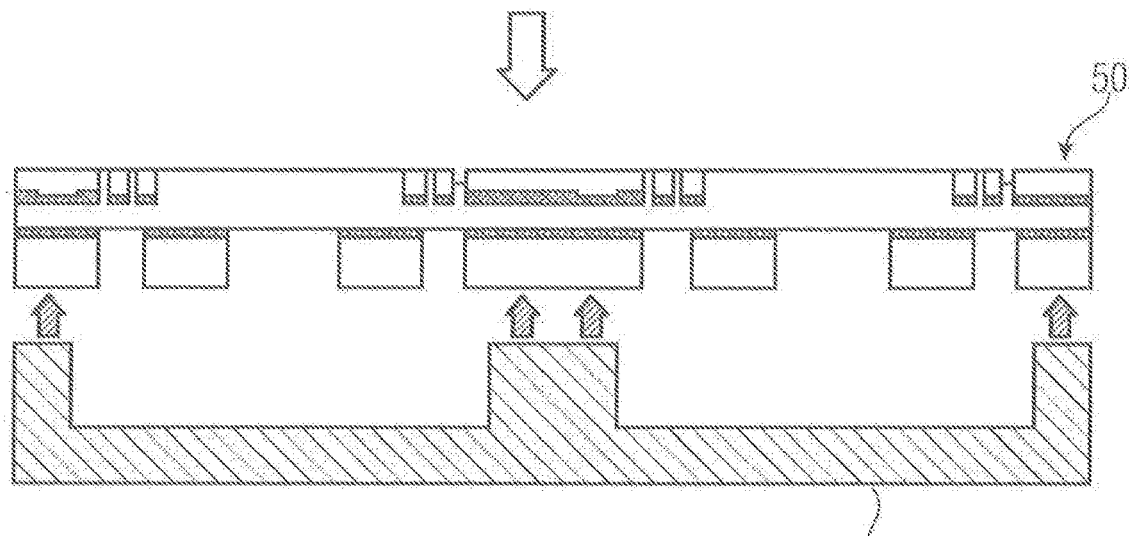
Figure 3C:
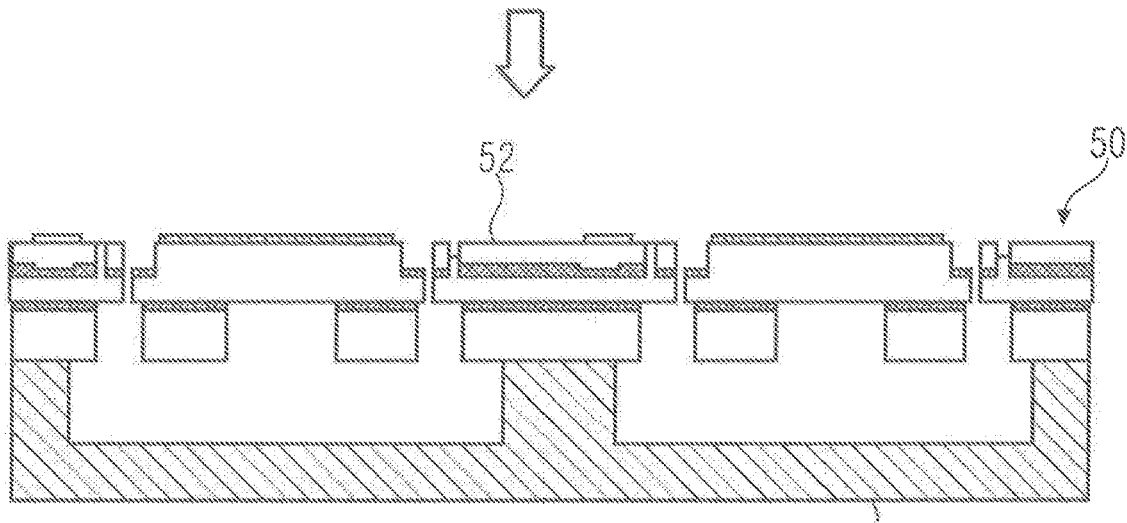
Figure 3D:
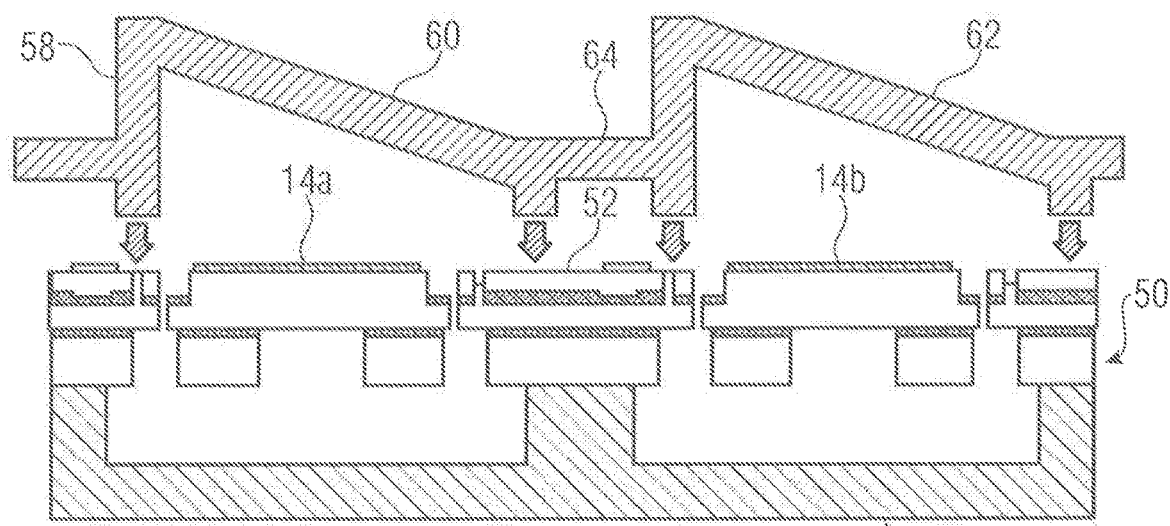
Figure 3E:
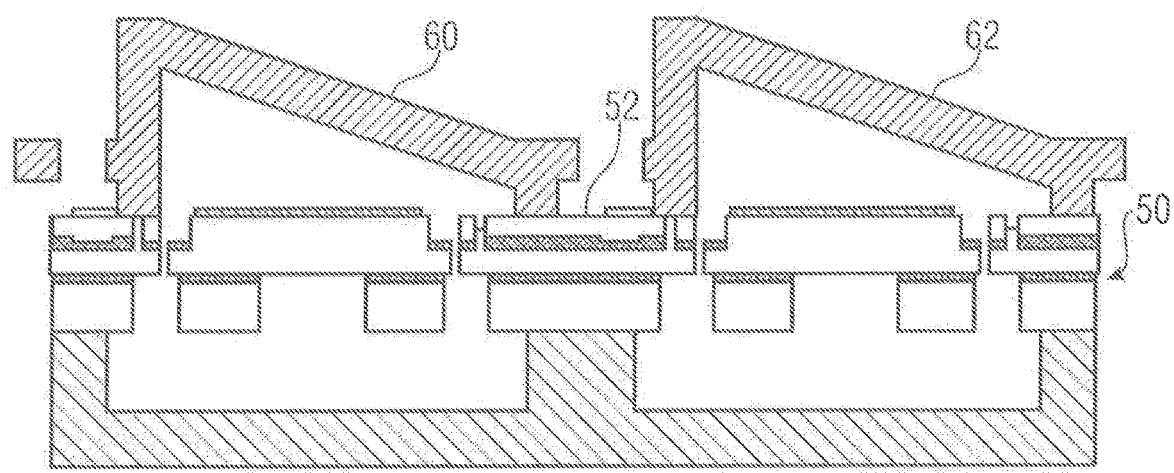
Figure 3F:
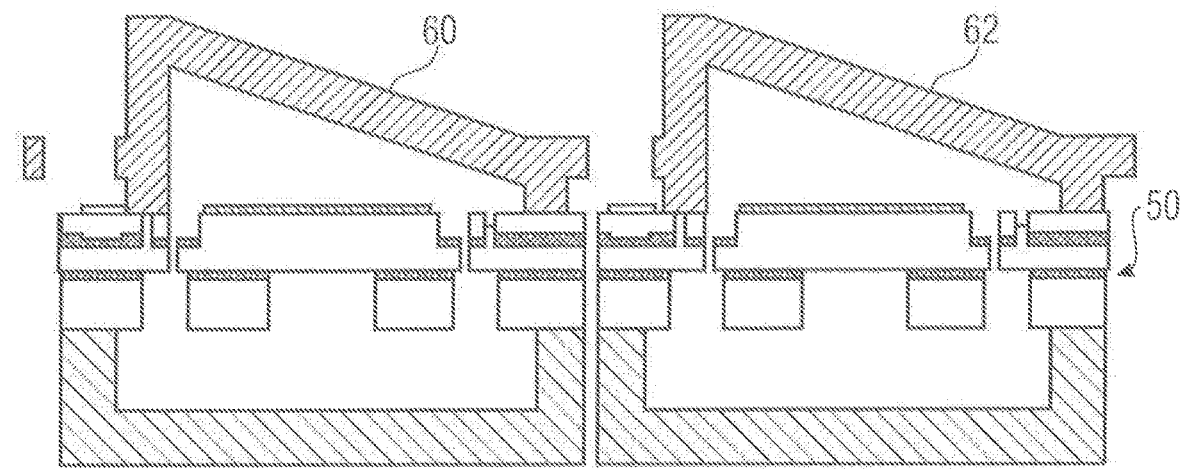

Referring to FIGS. 3A to 3B, a specific example is now explained. A MEMS wafer 50 which has undergone processing on a front side 52 and back side 54 thereof is shown in FIG. 3A. The front side 52 a represents a first side of the MEMS wafer 50 and the back side 54 represents a second side of the MEMS wafer 50. As shown in FIG. 3B, a back cover 56 is bonded to the backside of MEMS wafer 15. Back cover 56 may be a glass cover formed by hot embossing. Back cover 56 may be formed from other materials, in particular in the case back cover 56 need not be translucent. In the example shown, the front side 52 was not completely processed before bonding back cover 56 to back side 54. Thus, after bonding back cover 56 to back side 54, MEMS wafer 50 may be processed from the front side 52 thereof to release movable elements 14a, 14b, each of which is associated with a MEMS device. Moreover, metal layers may be formed and/or structured on the front side 52. The resulting structure is shown in FIG. 3C. Thereupon, a glass cover member 58 is bonded to the front side 52 of MEMS wafer 50, FIG. 3D. Glass cover member 58 is formed by hot embossing. Glass cover member 58 comprises glass covers 60, 62 for a plurality of MEMS devices. While only two glass covers 60 and 62 are shown, glass cover member 58 may comprise a plurality of glass covers for a plurality of MEMS devices arranged in MEMS wafer 50 in a two-dimensional array. Thus, glass covers of glass cover member 58 may also be arranged in a two-dimensional array. Upon bonding glass cover member 58 to MEMS wafer 50, bridges 64 connecting glass covers 60, 62 of adjacent MEMS devices to each other may be cut to expose pads on the front side 52. The resulting structure is shown in FIG. 3E. Thereupon, singularization takes place to separate MEMS wafer 50 into individual MEMS devices 66, 68. Singularization may take place using common singularization techniques, such as mechanical sawing or laser cutting. The resulting structure is shown in FIG. 3F.

As can be seen from FIGS. 3A to 3G, the glass cover member 58 does not have any rounded transitions but comprises sharp edges. Moreover, the thickness of a planar portion of the glass covers 60, 62, which extends in an angle relative to the substrate plane has the same thickness as side wall portions extending perpendicular to the substrate plane. The term substrate plane refers to the plane spanned by the larger dimensions of the substrate, i.e. the length and the width thereof, while the direction perpendicular to the substrate plane is the thickness direction thereof.

In order to form a glass cover member by hot embossing, glass suitable for the composite system is heated up to its softening point, i.e., the glass transition temperature Tg, and is pressed using pre-structured pressing tools. The pressing tools comprise structures corresponding to the inverse of the structures to be produced. Upon cooling down of the glass, the structures defined by the pressing tools are generated reproducible over the whole diameter of the wafer.

Figure 4:
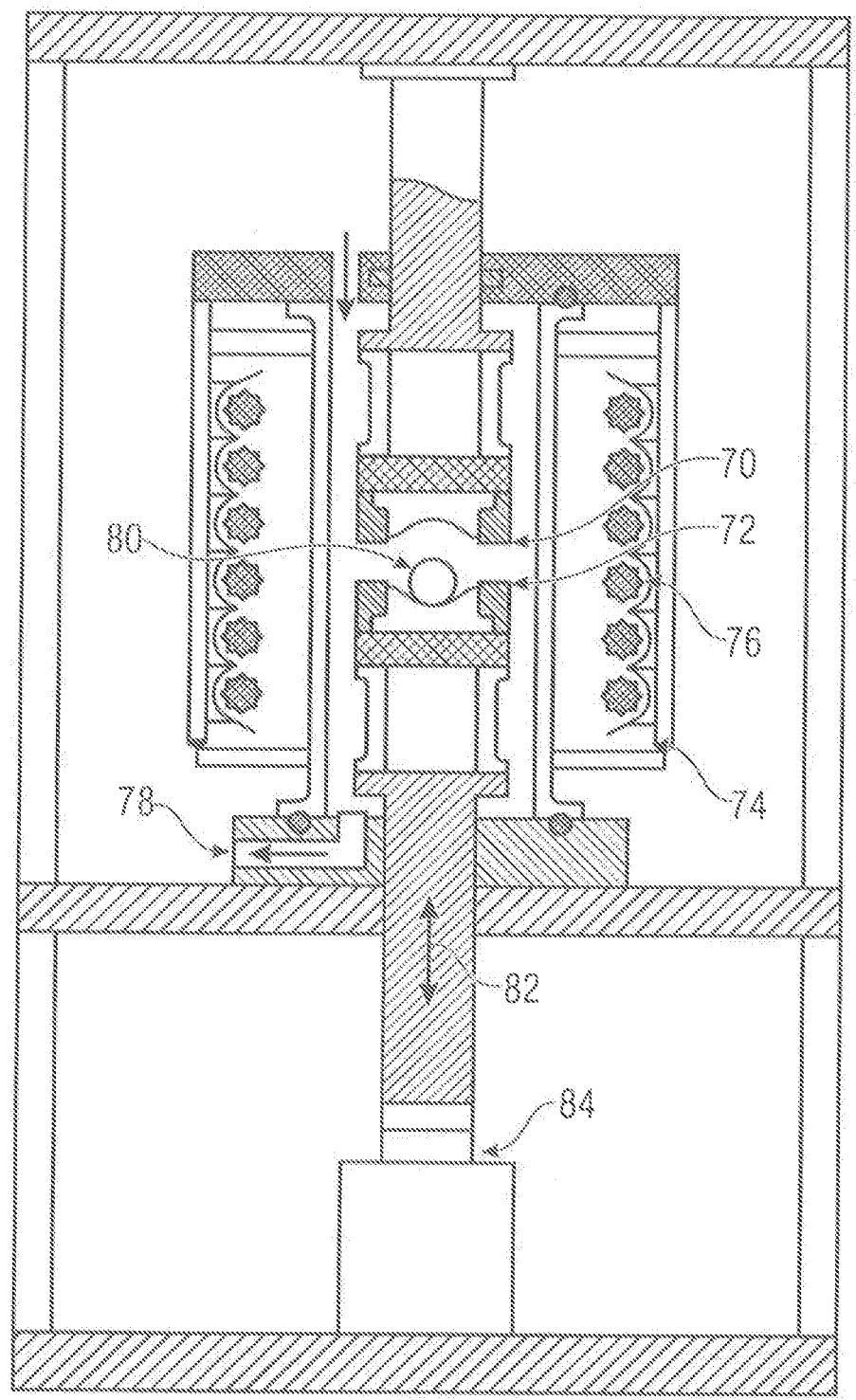
FIG. 4 shows a schematic view of an equipment for a hot embossing.

FIG. 4 shows schematically an example of an equipment for hot embossing. An upper pressing tool 70 and a lower pressing tool 72 are provided within a process chamber 74. Heating elements 76 are provided in the process chamber 74. The interior of process chamber 74 may be fluidically connected to a vacuum pump via a supply line 78. Glass material 80, from which the hot embossed member is to be formed is placed within a process chamber 74 between pressing tools 70 and 72. At least one of the pressing tools 70, 72 is movable relative to the other one so that glass material 80 can be pressed between them upon heating thereof. This is indicated by an arrow 82 in FIG. 4. In examples, a hydraulic system 84 may be provided to move one of the pressing tools.

Upon loading glass material 80 into process chamber 74 it is heated using heating elements 76 up to its softening point. Thereupon, lower pressing tool 72 is moved relative to upper pressing tool 70 so that the glass material is hot embossed according to the inverse structures formed in the pressing tools 70, 72. Thereupon, the glass material is cooled down and taken from the equipment.

The pressing tools may be configured to generate a glass cover member having a desired shape. When compared to other methods, such as the reflow method cited above, hot embossing may permit a larger variety of shapes to be formed by simply changing the pressing tools. In particular, beside a glass cover having a planar member, dome shaped glass packages may be generated in such a quality that the same are suitable for an operation of an optical MEMS device free of losses and free of interferences.

Figure 5A:
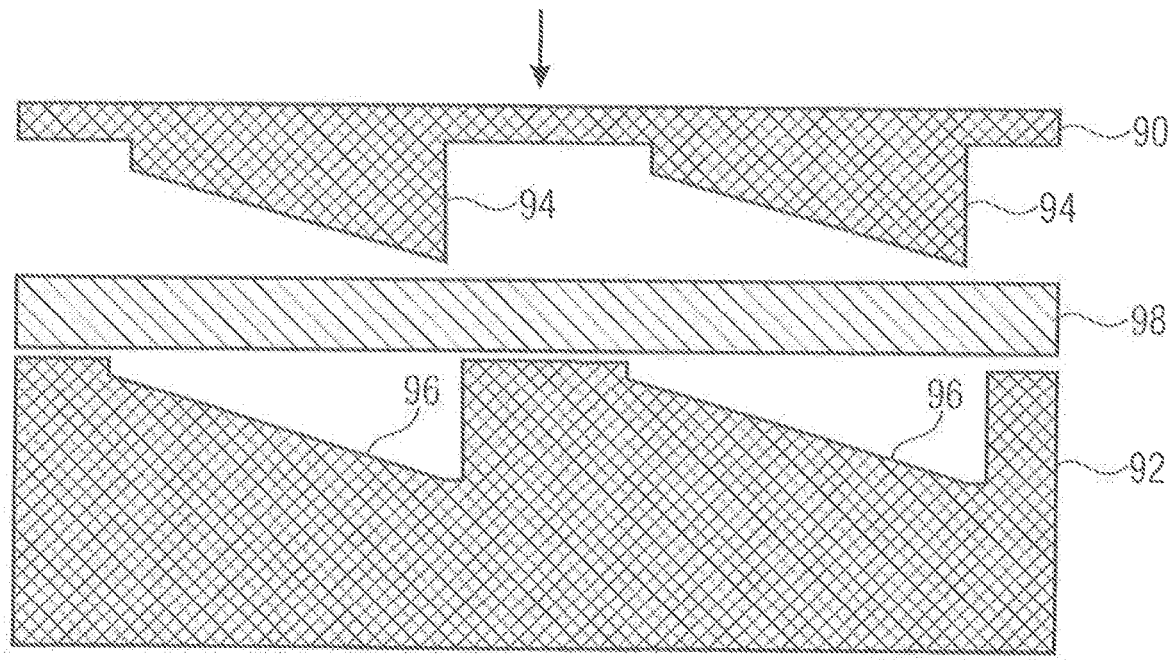
FIGS. 5A to 5C show schematic cross-sectional views of an example of hot embossing glass covers having inclined planar members.
Figure 5B:
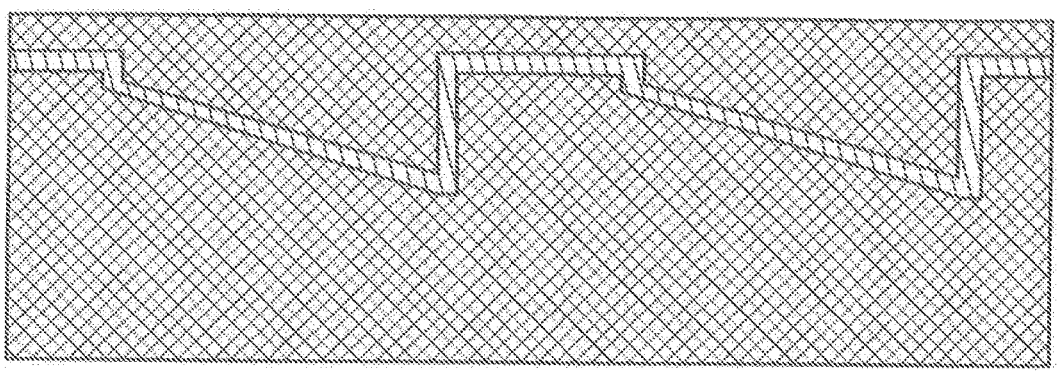

FIG. 5A shows two pressing tools 90, 92 configured to hot emboss a glass cover member comprising glass covers with planar members. An upper pressing tool 90 comprises protrusions 94 and a lower pressing tool 92 comprises recesses 96. A glass plate 98 is arranged between pressing tools 90, 92. Each protrusion 94 comprises an inclined surface facing a corresponding inclined surface in one of recesses 96. As shown in FIG. 5B pressing tools 90, 92 are moved towards each other so that glass plate 98 is deformed according to the cavity remaining between the upper and lower pressing tools 90, 92. Thereupon, pressing tools 90, 92 are separated from each other and the hot embossed glass cover member 58a is taken therefrom. An arrow in FIG. 5C shows where the glass cover member 58a is to be cut later on when singularizing individual MEMS devices from the MEMS wafer.

FIG. 6A shows two pressing tools 100, 102 configured to hot emboss a glass cover member comprising dome shaped glass covers. An upper pressing tool 100 comprises convex dome shaped protrusions 104 and a lower pressing tool 102 comprises concave dome shaped recesses 106. Upon pressing the upper pressing tool 100 and the lower pressing tool 102 towards each other a cavity is remaining, see FIG. 6B. Glass plate 98 is deformed to take the shape of this cavity and the glass cover member 58b comprising dome shaped glass covers may be taken from pressing tools 100, 102 after separating the same from each other. The resulting glass cover member 58b is shown in FIG. 6C.

The examples shown in FIG. 5 and FIG. 6 are for a specific optical MEMS application, such as a MEMS application, in which the movable element is formed by a micro mirror. In other applications, the glass covers may have a different shape and may be adapted to specific MEMS applications and/or MEMS devices. This can be achieved in a flexible manner by changing the pressing tools as hot embossing represents an easy method to structure glass in three dimensions. The process parameters and the demands on the glass material to be processed may vary in a wide range by means of the composition of the material and further process parameters such as temperature and pressure. The back cover 56 in FIG. 3 may also be generated using correspondingly adapted pressing tools. Due to the high surface quality of the structures realized using hot embossing, examples of the present disclosure are particularly suited for optical components, such as covers for optical MEMS devices. In examples, additional optical components, such as lenses, may be incorporated into the glass cover.

Figure 5C:
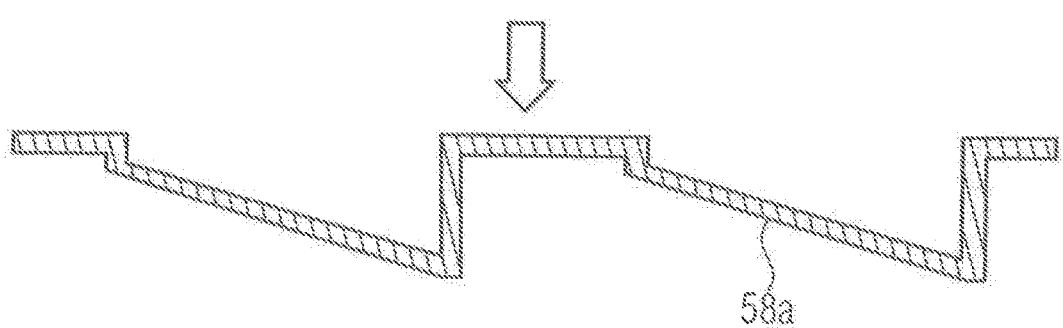

When compared to glass cover member 58 shown in FIG. 3, glass cover member 58a shown in FIG. 5C may not comprise spacers for sufficiently spacing the glass covers from the MEMS substrate. In such a case, an additional perforated spacer layer may be generated and provided between the glass cover member and the MEMS substrate. FIG. 7A shows glass cover member 58a of FIG. 5C as wafer1 and an additional perforated spacer layer as wafer2. Both wafers may be generated independent from each other and may be bonded to each other after generation thereof. Both wafers may be bonded to each other to form glass cover member 58 as shown in FIG. 7D. In other examples, pressing tools may be adapted to form the spacers integrally with the glass cover member. This is shown in FIGS. 7B and 7C. As it is shown in FIG. 7B upper pressing tool 90a comprises spacer recesses 110 at the sides of protrusions 94 so that, after hot embossing, glass cover member 58 comprises spacers 112 as shown in FIG. 7D. Spacers 112 represent parts of the sidewalls of the respective glass cover and completely surround the cavity including the movable member upon bonding the glass cover member to the MEMS wafer.

FIG. 7D shows the resulting glass cover member 58, which may be achieved by separate layers bonded to each other as shown in FIG. 7A or by an integral layer is shown in FIGS. 7B and 7C.

Different methods may be used to bond the glass cover member to the MEMS substrate. In the following, some examples are described how bonding may be achieved. Common bond methods may be used, such as adhesive bonding, anodic bonding, fusion bonding, eutectic bonding or bonding using glass frits or a glass paste. However, it turned out that bonding using laser microwelding may be best suited to bond the glass cover member to the MEMS substrate.

In adhesive bonding, two materials are bonded to each other in an irreversible manner using an adhesive layer. It may be difficult to achieve a hermetically sealing connection which is long-term stable against external influences such as humidity and chemicals using an adhesive layer. Moreover, the adhesive may undergo outgassing which may result in contaminations and variations in the internal pressure of the cavity. Different coefficients of thermal expansion, CTEs, between the adhesive and the glass and/or the MEMS substrate material may result in stress conditions and, therefore, the performance of the MEMS. Moreover, adhesive bonding may result in a reduced temperature stability.

Anodic bonding may be better suited to achieve a hermetical connection if planar surfaces with a roughness of less than 20 nm are available for a stable connection. The coefficients of thermal expansions of both materials should be adjusted to each other, in particular in view of process temperatures of as much as 400° C. In order for the bond mechanism to work, the glass should include alkali ions at the bond interface.

A connection at wafer level may be implemented using a fusion bond at room temperature or a higher temperature. This method may be suitable to bond different materials to each other if highly planar surfaces with a low roughness of less than 0.5 nm are available.

Eutectic bonding is typically achieved by means of one or more metal layers. Under the effect of a controlled force a diffusion zone is formed at the eutectic point in case of a sufficiently high temperature. The diffusion zone may provide a firm bonding between different materials. This method permits larger surface irregularities to be compensated for. However, process temperatures for generating the eutectic mixture may be very high, such as 379° C. for Si—Au and 580° C. for Si—Al. The thermal coefficients of thermal expansion of the materials to be bonded should be adjusted to each other.

Bonding using glass frits or a glass paste permits a hermetical connection between two substrates. While applying the glass frits or paste and burning out a solvent may be achieved on one side, i.e. on a support substrate, such as the glass cover member, and at moderate temperatures of less than 400° C., the final connecting step, i.e., firing, is to be done at higher temperatures of up to 500° C. The metallization of the MEMS wafer is to be configured to withstand such temperatures. Moreover, the composition of the glass frits or paste and the solder has often a higher coefficient of thermal expansion then the substrate, such as a silicon substrate.

The described methods may require plane-parallel plates or local studs for a direct connection between glass and silicon in order to ensure a contact between both materials by means of a defined force input. Due to the three-dimensional structuring of the glass cover member additional measures may be implemented to achieve the desired result, such as special chucks for maneuvering the glass cover member. This may result in increased process efforts and reduced degrees of freedom in design.

Generally, each bonding method for achieving a hermetical bond between the glass cover member and the MEMS substrate may be used. However, it was recognized that a method known as laser microwelding may be most appropriate to bond the glass cover member to the MEMS substrate. In laser microwelding or glass microwelding, glass at the interface to the material of the MEMS substrate, such as the silicon of the MEMS substrate, is molten locally using a laser so as to generate an irreversible bond. In this method, temperature input is locally limited to the position where welding using the laser beam is performed. Thus, this is independent from the metallization of the MEMS wafer. While this method achieves a relatively local connection, keeping differences between coefficients of thermal expansion of the materials to be connected to each other low may be helpful to achieve a durable hermetically sealed connection. Glass microwelding using a laser beam may permit connecting relatively complex geometries and different materials. A movement path of the laser may be adapted to a specific design and maneuvering the 3D structure glass cover member may be achieved by any suitable unit. This may be achieved without pressure plates or pins to provide a direct contact between the glass cover member and the MEMS substrate. Clamping the glass cover member and the MEMS substrate together should be sufficient. Bonding is achieved without additional layers while still achieving a sufficiently adhesion of the glass at the material interface after the melting process. Thus, there is a high degree of freedom with respect to the materials which may be bonded to each other. Moreover, bonding may be achieved at different process pressures at the presence of different process gases, such as inert gases.

FIG. 8 shows schematically a bottom glass wafer 120, a silicon wafer 122 arranged on top of the bottom glass wafer 120, and a top glass wafer 124 arranged on top of the silicon wafer 122. Silicon wafer 122 may represent a MEMS wafer including one or more movable elements, such as a closed membrane in a left portion and a cantilever beam in the right portion thereof. The device shown in FIG. 8 may represent an acceleration and pressure sensor, wherein pressure may be detected using the closed membrane and acceleration may be detected using the cantilever beam. In examples, top glass wafer 124 and/or bottom glass wafer 120 may be implemented as hot embossed glass covers. Laser welding may be performed to bond top glass wafer 124 to an upper surface of silicon wafer 122 and to bond bottom glass wafer 120 to a lower surface of silicon wafer 122. Glass welding takes place at respective welding locations 126 using laser light 128. As indicated by arrows in FIG. 8, a laser providing the laser light 128 may be moved relative to the wafer stack in order to connect the wafers at desired locations.

Figure 9A:
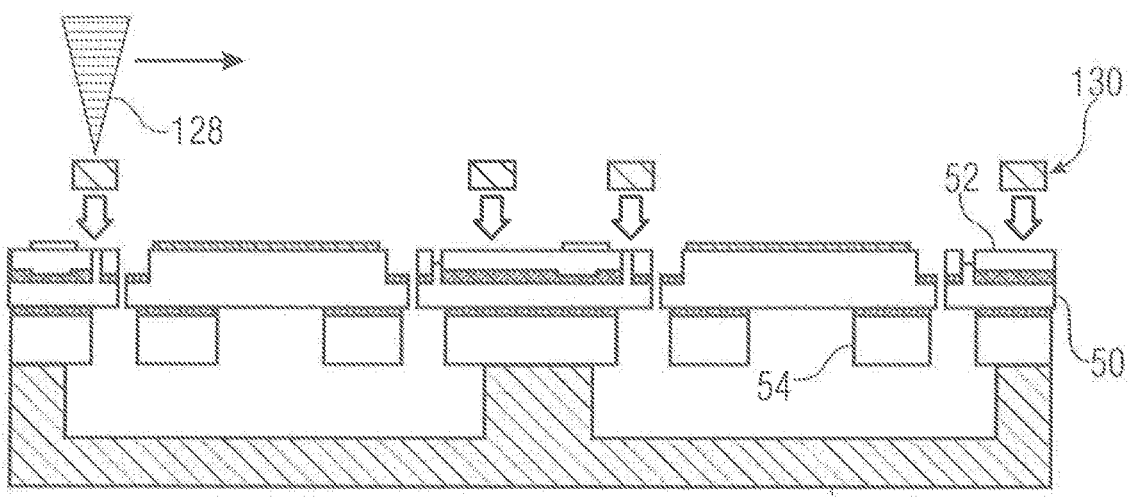
FIGS. 9A to 9C schematic cross-sectional views of an example of generating a MEMS device using a spacer layer.
Figure 9B:
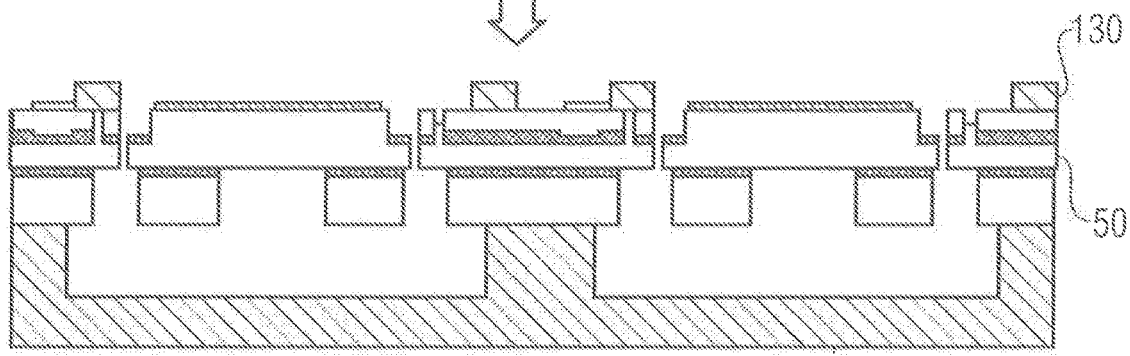
Figure 9C:
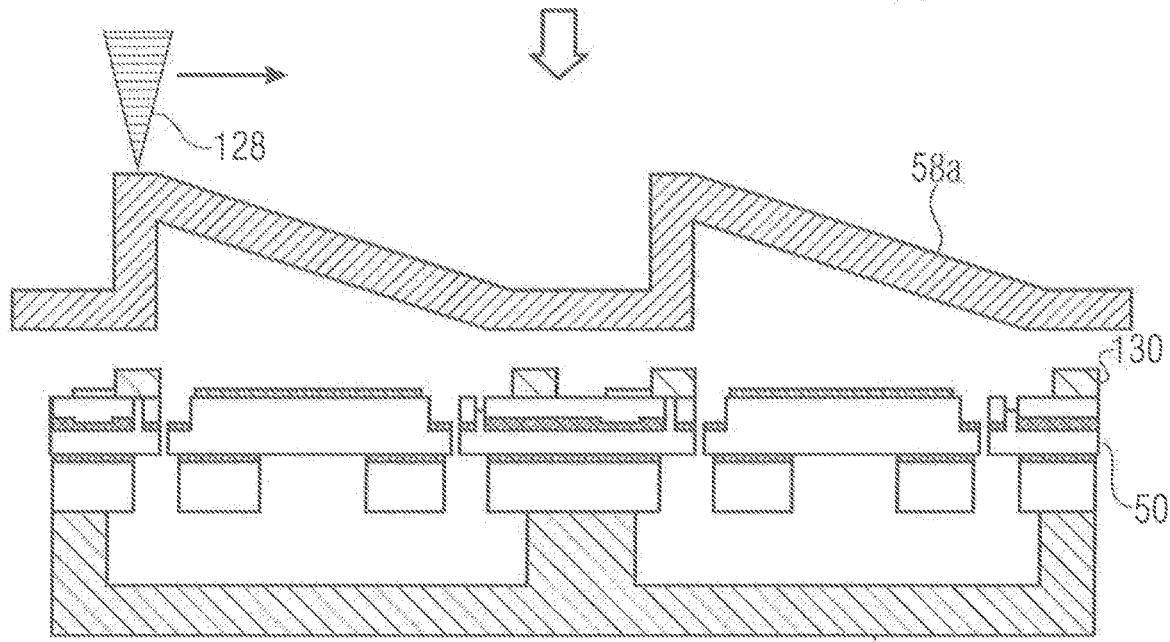

FIGS. 9A to 9C show an example in which a perforated spacer glass layer 130 is bonded to the first side 52 of MEMS wafer 50 using glass microwelding. Back cover 56 may be bonded to the second side 54 of MEMS wafer 50 using glass microwelding as well. MEMS wafer 50 with perforated spacer layer 130 at the first surface and the back cover 56 at the second surface is shown in FIG. 9B. Thereupon, as shown in FIG. 9C, glass cover member 58*a* is bonded to perforated spacer layer 130 using glass microwelding. Thus, glass microwelding between two glass members takes place in bonding glass cover member 58a to MEMS wafer 50.

In other examples, glass cover member 58 integrally including spacer members 112 as shown in FIG. 7D may be bonded to MEMS wafer 50 directly without perforated spacer layer 130 therebetween.

Figure 10A:
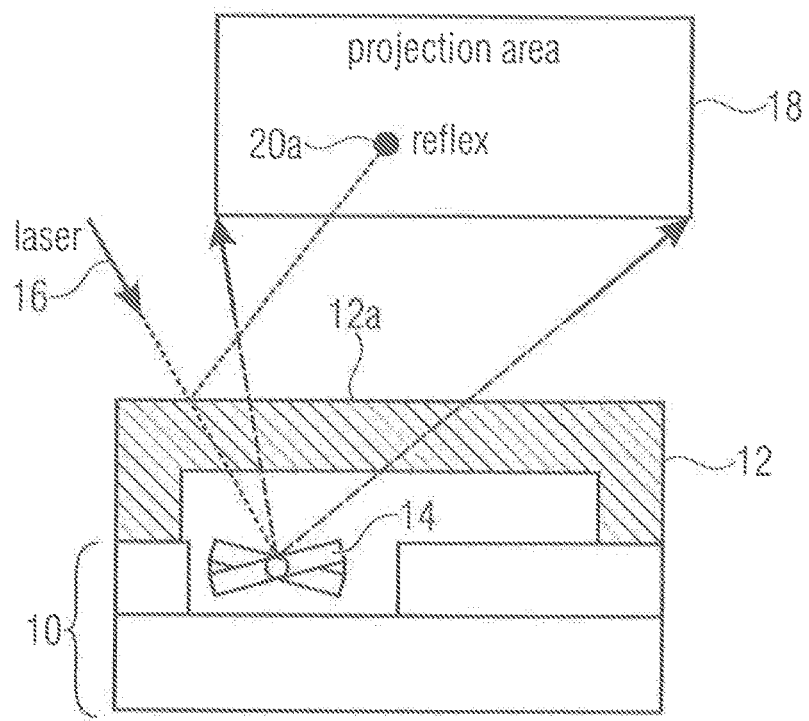
FIGS. 10A to 10B show schematic cross-sectional views of a MEMS substrate with a glass cover.
Figure 10B:
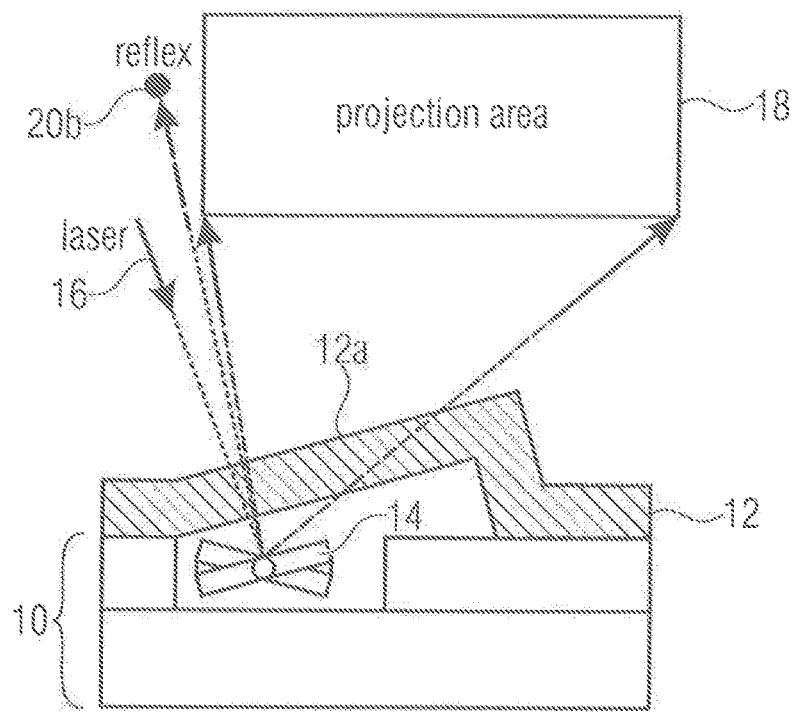

Thus, in examples, bonding is achieved by locally melting glass, wherein such bonding can be achieved between two glass members, between glass and silicon and between glass and other materials. Microwelding may be achieved in situ without moving the wafers and without applying pressure to the wafers. This permits an additional degree of freedom with respect to the selection of material if a spacer substrate is to be used. Glass microwelding is particularly suited for 3D structured glasses, for glass/glass bonds, glass/silicon bonds, glass/glass/silicon bonds or glass/glass/silicon/glass bonds. Moreover, glass microwelding methods are easy to scale up (e.g. bigger wafer diameter) If the glass cover serves as a package for an optical MEMS device, the package and the quality thereof have a direct influence on the behavior of the system. If the glass cover is formed plane-parallel to the substrate plane, a bright spot may result in a projection image area due to a partial reflection at the interface between air and the glass cover. Reference is made to FIGS. 10A and 10B, which show schematic cross-sectional views of a MEMS substrate 10 having attached thereto a glass cover 12. The MEMS substrate 10 comprises a movable element 14, such as a deflectable mirror. Glass cover 12 is attached to substrate 10 so as to hermetically seal movable element 14. According to FIG. 10A, a planar upper member 12a of cover 12 is arranged plane-parallel to the MEMS substrate, i.e. parallel to a plane of the MEMS substrate. Generally, the MEMS substrate plane may be a plane parallel to a plane spanned the major extensions of the MEMS substrate, i.e., the length and the width of the substrate. According to FIG. 10B, the planar upper member 12a of cover 12 is arranged in an angle relative to the substrate plane.

The deflectable mirror may be configured to reflect incident laser light to a projection image area 18. Incident laser light 16 may fall through planar member 12a and may be reflected at movable member 14. Fractions of laser light 16 may be reflected at the air/glass interface of the planar member 12a as shown in FIGS. 10A and 10B. According to FIG. 10A the partially reflected laser light may reach projection area 18 and may form a bright spot which is shown as a reflex point 20a. According to FIG. 10B, light reflected at the air/glass interface of planar member 12a does not reach projection area 18, see reflex point 20b. Thus, disturbances due to partial reflections at cover 12 can be reduced or prevented by arranging planar member 12a with a specific angle relative to the MEMS device, i.e. the substrate plane.

Thus, examples of the disclosure generate structures of 3D packages at wafer level for MOEMS applications using a hot embossing method of glass. As explained above, such a method permits beneficial effects when compared to a reflow method with respect to possible structural geometries and with respect to reproducibility. In examples, an irreversible connection between the so manufactured 3D glass package to the MEMS substrate is produced using a laser microwelding method. Such a bonding method may be beneficial when compared to other common bonding methods with respect to temperature compatibility, CTE mismatch and the combination of composite materials and, therefore, simplifies integration of the method into semiconductor manufacturing processes.

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus.

In the foregoing Detailed Description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, subject matter of the present disclosure may lie in less than all features of a single disclosed example. Thus, the following claims are hereby incorporated into the Detailed Description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

The above described examples are merely illustrative for the principles of the present disclosure. It is understood that modifications and variations of the arrangements and the details described herein will be apparent to others skilled in the art. It is the intent, therefore, to be limited only by the scope of the pending patent claims and not by the specific details presented by way of description and explanation of the examples herein.

LIST OF REFERENCE SIGNS

10 MEMS substrate
12 glass cover
12a planar member of glass cover
12b, 12c side walls of glass cover
14, 14a, 14b movable member
16 laser light
17 stop member
18 projection area
20a, 20b reflex points
50 MEMS wafer
52 first side of MEMS wafer
54 second side of MEMS wafer
56 back cover
58, 58a, 58b glass cover member
60, 62 planar members
64 bridge member
66, 68 MEMS devices
70, 72 pressing tools
74 process chamber
76 heating elements
78 vacuum supply line
80 glass material
82 movement arrow
84 hydraulic system
90, 90a upper pressing tools
92 lower pressing tool 94 protrusions
96 recesses
98 glass plate
100, 102 pressing tools
104 dome shaped protrusions
106 dome shaped recesses
110 spacer recesses
112 spacer members
120 bottom glass wafer
122 silicon wafer
124 top glass wafer
126 welding locations
128 laser light
130 perforated spacer layer

What is claimed is:

1. A method of generating a microelectromechanical system (MEMS) device, the method comprising:
providing a MEMS substrate comprising a plurality of movable elements;
heating a glass to a transition temperature of the glass;
performing hot embossing by utilizing a pre-structured pressing tool to press the heated glass to form a first glass cover member comprising a plurality of first glass covers,
wherein a surface roughness of the glass cover member is less than 4 nm;
bonding, during a frontend process occurring prior to pre-assembly of the MEMS device and prior to a process for assembly of a printed circuit board, the first glass cover member to a first side of the MEMS substrate;
performing hot embossing to form a second glass cover member comprising a plurality of second glass covers; and
bonding, after bonding the first glass cover member to the first side of the MEMS substrate, the second glass cover member to a second side of the MEMS substrate opposite the first side thereof, wherein the first glass cover member and the second glass cover member are bonded to the MEMS substrate so as to hermetically seal by a respective one of the first glass cover and the second glass cover one of a plurality of cavities, wherein one of the plurality of movable elements is arranged in each of the plurality of cavities and, by being arranged in each of the plurality of cavities, is separated from each of the plurality of movable elements from a remaining portion of movable elements of the plurality of movable elements, and wherein the plurality of movable elements comprise a plurality of movable mirrors for a light detection and ranging (LIDAR) application or a plurality of movable parts of an optical gas sensor, of an optical pressure sensor, or of an optical acceleration sensor.

2. The method of claim 1, further comprising:
singularizing the MEMS substrate and the first glass cover member bonded thereto into a plurality of MEMS devices, wherein the plurality of cavities remain hermetically sealed.

3. The method of claim 1,
wherein bonding the first glass cover member to the first side of the MEMS substrate comprises using a laser microwelding method.

4. The method of claim 1,
wherein each glass cover of the plurality of first glass covers comprises side walls extending in an angle of between 80° and 90° relative to a plane of the MEMS substrate.

5. The method of claim 1,
wherein each glass cover of the plurality of first glass covers comprises sharp edges between different portions thereof and does not comprise rounded transitions between portions thereof.

6. The method of claim 1,
wherein each glass cover of the plurality of first glass covers comprises a dome shaped structure.

7. The method of claim 1, further comprising:
providing a perforated spacer layer between the first glass cover member and the MEMS substrate prior to bonding the first glass cover member to the first side of the MEMS substrate.

8. The method of claim 1, further comprising:
bonding the first glass cover member to the first side of the MEMS substrate in a presence of an inert process gas.

9. The method of claim 1,
wherein the plurality of movable elements are the plurality of movable mirrors for the LIDAR application.

10. The method of claim 1,
wherein the plurality of movable elements are the plurality of movable parts of the optical gas sensor.

11. The method of claim 1,
wherein forming the first glass cover member comprises forming a mechanical stop member protruding from each of the plurality of first glass covers inwards and representing a mechanical stop for a movement of each of the plurality of movable elements upon bonding the first glass cover member to the first side of the MEMS substrate.

12. The method of claim 1,
wherein the plurality of movable elements are the plurality of movable parts of the optical pressure sensor.

13. The method of claim 1,
wherein the plurality of movable elements are the plurality of movable parts of the optical acceleration sensor.

14. A method of generating a microelectromechanical system (MEMS) device, the method comprising:
heating a glass to a transition temperature of the glass;
performing hot embossing by utilizing a pre-structured pressing tool to press the heated glass to form a first glass cover member comprising a plurality of first glass covers,
wherein a surface roughness of the glass cover member is less than 4 nm;
bonding, during a frontend process occurring prior to pre-assembly of the MEMS device and prior to a process for assembly of a printed circuit board, the first glass cover member to a first side of a MEMS substrate;
performing hot embossing to form a second glass cover member comprising a plurality of second glass covers; and
bonding, after bonding the first glass cover member to the first side of the MEMS substrate, the second glass cover member to a second side of the MEMS substrate opposite the first side thereof, wherein the first glass cover member and the second glass cover member are bonded to the MEMS substrate so as to hermetically seal by a respective one of the first glass cover and the second glass cover one of a plurality of cavities, wherein one of a plurality of movable elements is arranged in each of the plurality of cavities and, by being arranged in each of the plurality of cavities, is separated from each of the plurality of movable elements from a remaining portion of movable elements of the plurality of movable elements, and wherein the plurality of movable elements comprise a plurality of movable mirrors for a light detection and ranging (LIDAR) application or a plurality of movable parts of an optical gas sensor, of an optical pressure sensor, or of an optical acceleration sensor.

15. The method of claim 14, further comprising:
singularizing the MEMS substrate and the first glass cover member bonded thereto into a plurality of MEMS devices, wherein the plurality of cavities remain hermetically sealed.

16. The method of claim 14,
wherein bonding the first glass cover member to the first side of the MEMS substrate comprises:
    using a laser microwelding method to bond the first glass cover member to the first side of the MEMS substrate.

17. The method of claim 14,
wherein each glass cover of the plurality of first glass covers comprises side walls extending in an angle of between 80° and 90° relative to a plane of the MEMS substrate.

18. The method of claim 14,
wherein each glass cover of the plurality of first glass covers comprises sharp edges between different portions thereof and does not comprise rounded transitions between portions thereof.

19. The method of claim 14,
wherein each glass cover of the plurality of first glass covers comprises a dome shaped structure.

20. The method of claim 14, further comprising:
providing a perforated spacer layer between the first glass cover member and the MEMS substrate prior to bonding the first glass cover member to the first side of the MEMS substrate.

21. The method of claim 14, further comprising:
bonding the first glass cover member to the first side of the MEMS substrate in a presence of an inert process gas.

22. The method of claim 14,
wherein the plurality of movable elements are the plurality of movable mirrors for the LIDAR application.

23. The method of claim 14,
wherein the plurality of movable elements are the plurality of movable parts of the optical gas sensor.

24. The method of claim 14,
wherein the plurality of movable elements are the plurality of movable parts of the optical pressure sensor.

25. The method of claim 14,
wherein the plurality of movable elements are the plurality of movable parts of the optical acceleration sensor.

* * * * *